United States Patent [19]

Lee

[11] Patent Number: 5,502,366
[45] Date of Patent: Mar. 26, 1996

[54] BATTERY PACK COUPLER FOR CAMCORDER WITH SLIDING LEVER

[75] Inventor: Chang H. Lee, Yongin, Rep. of Korea

[73] Assignee: Samsung Electronics Co., Ltd., Kyungki, Rep. of Korea

[21] Appl. No.: 242,849

[22] Filed: May 16, 1994

[30] Foreign Application Priority Data

Jul. 27, 1993 [KR] Rep. of Korea ............ 93-14066

[51] Int. Cl.⁶ ................................................ H01M 10/46
[52] U.S. Cl. ................................................ 320/2
[58] Field of Search .................. 320/2, 5; 429/96–100; D. 13/103, 107–108

[56] References Cited

U.S. PATENT DOCUMENTS

| | | | |
|---|---|---|---|
| D. 349,094 | 7/1994 | Alexandres et al. | D13/103 |
| 4,578,628 | 3/1986 | Siwiak | 320/2 |
| 4,943,498 | 7/1990 | Cooper et al. | 429/97 |
| 5,259,786 | 11/1993 | Huang | 429/98 X |
| 5,306,576 | 4/1994 | Sasaki | 429/98 |
| 5,314,763 | 5/1994 | Aksoy et al. | 429/97 |
| 5,369,565 | 11/1994 | Chen et al. | 320/2 X |
| 5,396,162 | 3/1995 | Brilmyer | 320/2 |

Primary Examiner—Peter S. Wong
Assistant Examiner—Edward Tso
Attorney, Agent, or Firm—Sughrue, Mion, Zinn, Macpeak & Seas

[57] ABSTRACT

A battery pack coupler for a camcorder including a plurality of guide holes formed on a battery-attaching plate and guide ribs formed on the battery-attaching plate, all operating lever in which hooking pieces are provided on the inner surface of the battery-attaching plate and one end of which is projected outside a housing, and an elastically biasing device for elastically biasing the operating lever in one direction, wherein openings are formed on the bottom and one flank of a battery pack.

12 Claims, 4 Drawing Sheets

BATTERY PACK COUPLER FOR CAMCORDER WITH SLIDING LEVER

BACKGROUND OF THE INVENTION

The present invention relates to a battery pack coupler for a camcorder, and more particularly to a battery pack coupler for a camcorder having an improved structure which facilitates the adjoining and detaching of a battery from the housing of the camcorder.

In general, a camcorder is equipped with a rechargeable battery for supplying power. Such a rechargeable battery is made to join or separate from the main body of the camcorder by a coupler. FIGS. 1 and 2 illustrate a conventional battery pack coupler. Referring to the drawings, plural hooking protrusions 12–15 are provided on the top and bottom peripheries of a battery-attaching plate 11 located at the rear of a camcorder 10. Terminals 16 and 17, provided on battery-attaching plate 11, electrically connect the power from a battery pack 2 to the camcorder. Openings 3 and 4, into which hooking protrusions 12–15 are fitted, are placed on the flanks of battery pack 2. As shown in FIG. 2, a rocker 21 elastically emerging from the interior of the camcorder is installed on the battery-attaching plate 11. A release button 20 for releasing rocker 21 is provided on the side of the camcorder. An insertion hole (not shown) into which rocker 21 is inserted, is formed on the bottom of battery pack 2.

In the conventional battery pack coupler, when battery pack 2 is to be mounted onto battery-attaching plate 11, the battery pack is first positioned above and placed against battery-attaching plate 11 to press rocker 21 with the bottom of battery pack 2. Then, battery pack 2 is pushed downward so that hooking protrusions 12–15 engage and fit into openings 3 and 4.

When battery pack 2 is to be detached from camcorder 10, the release button 20 is operated (pushed or pulled) to release rocker 21 from the insertion hole (not shown) of battery pack 2, and then battery pack 2 is pushed laterally to detach it from hooking protrusions 12–15.

With the conventional battery pack coupler, the joining and removal of the battery pack from the camcorder is inconvenient. The joining operation requires simultaneous pressing and pushing of the battery pack 2 laterally. The removal of the battery requires operating the release button 20 and pushing battery pack 2 laterally.

SUMMARY OF THE INVENTION

To overcome the above difficulties, an object of the present invention is to provide a camcorder battery pack coupler having a structure that is improved to facilitate the joining and detaching of the battery pack.

To accomplish the object of the present invention, there is provided a battery pack coupler for uniting a battery pack to the battery-attaching plate of a camcorder housing, comprising: a plurality of guide holes formed on the battery-attaching plate; guide ribs formed on the battery-attaching plate while being spaced apart by the width of the battery pack; an operating lever in which hooking pieces passing through the plurality of guide holes are provided on the inner surface of the battery-attaching plate and one end of which is projected outside the housing; and an elastically biasing device for elastically biasing the operating lever in one direction, wherein openings are formed on the bottom and one flank of the battery pack.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
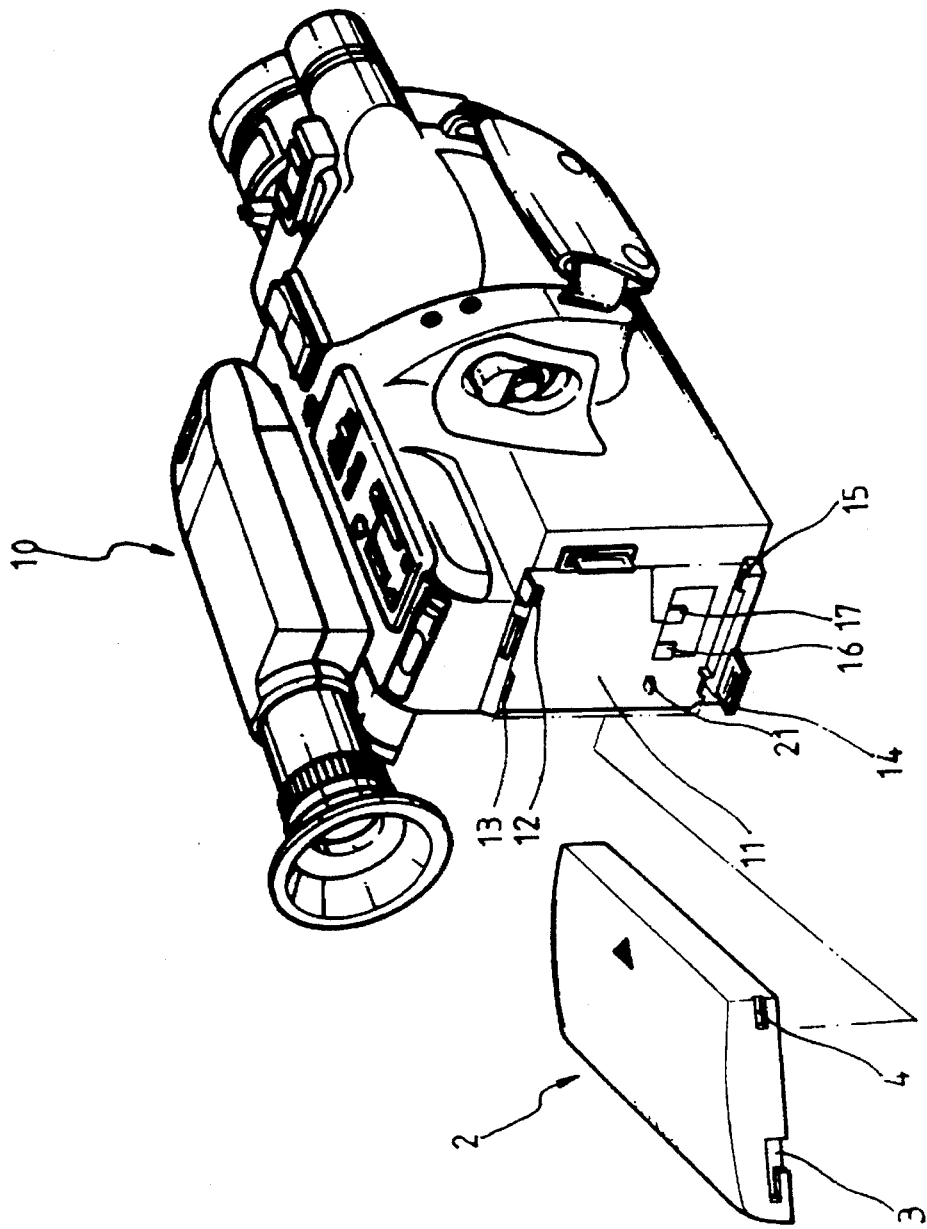
FIG. 1 is a schematic perspective view of a camcorder employing a conventional battery pack coupler.
Figure 2:
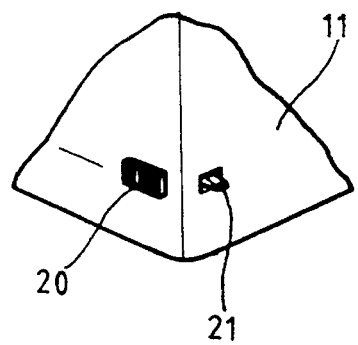
FIG. 2 is a schematic view extracted from FIG. 1.
Figure 3:
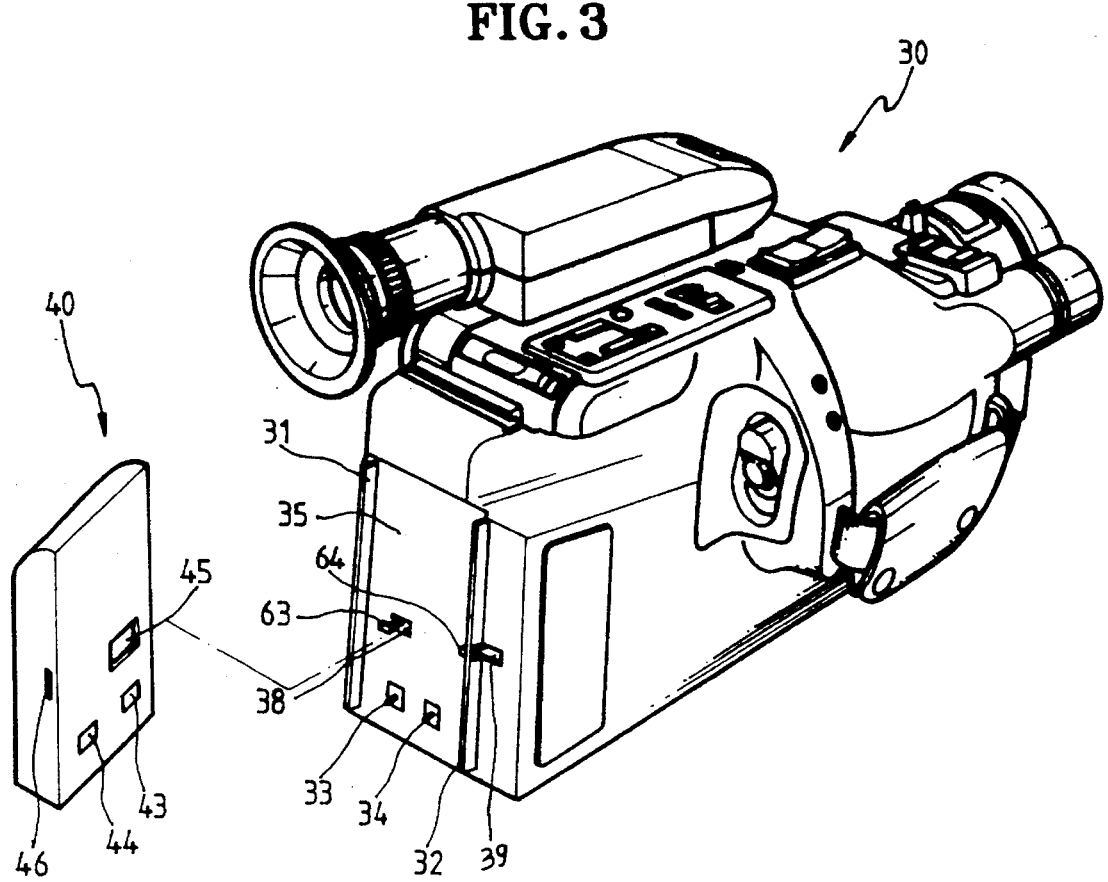
FIG. 3 is a schematic perspective view of a camcorder employing a battery pack coupler of the present invention.
Figure 4:
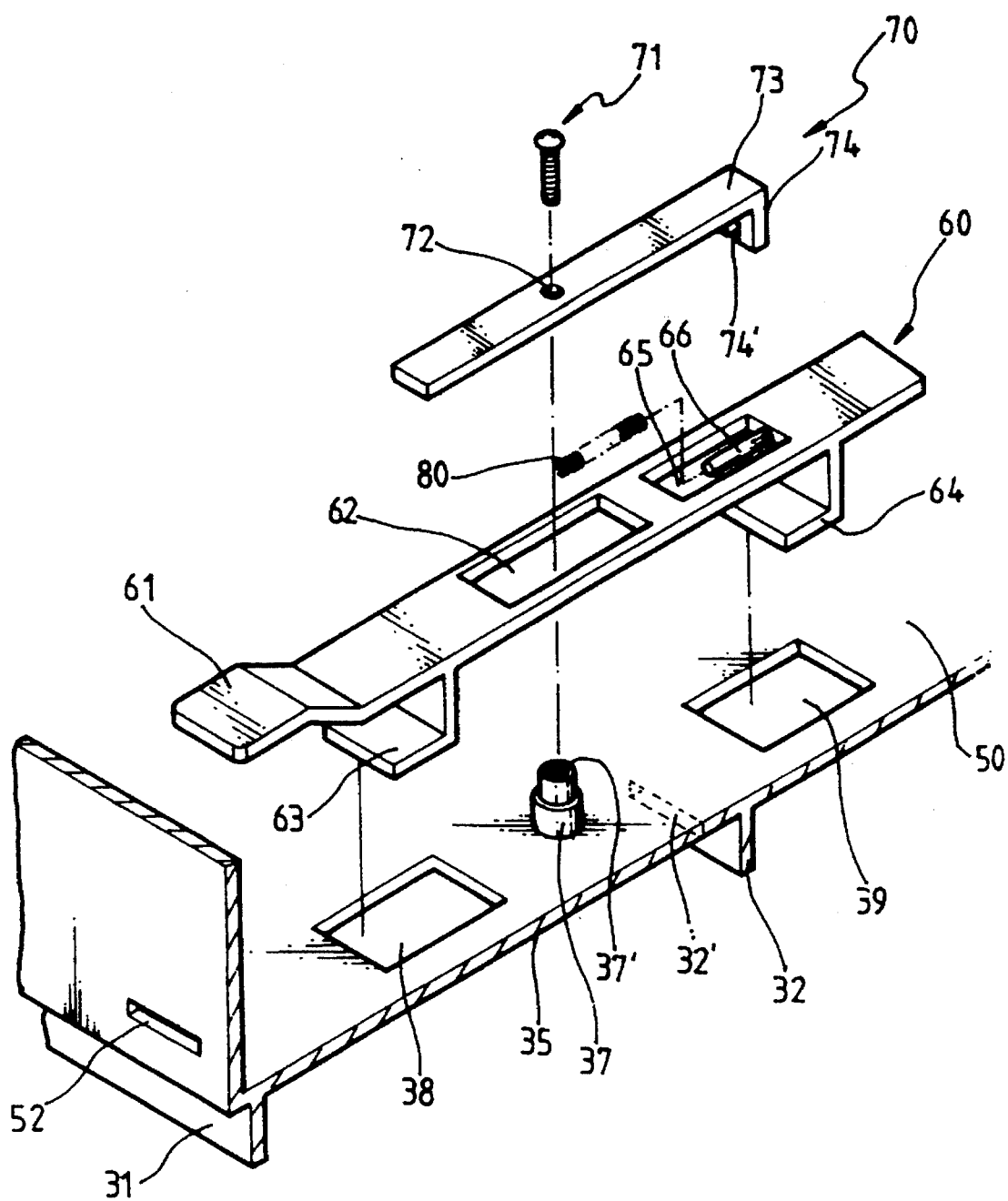
FIG. 4 is an exploded perspective view of the important components of the battery pack coupler of present invention.
Figure 5:
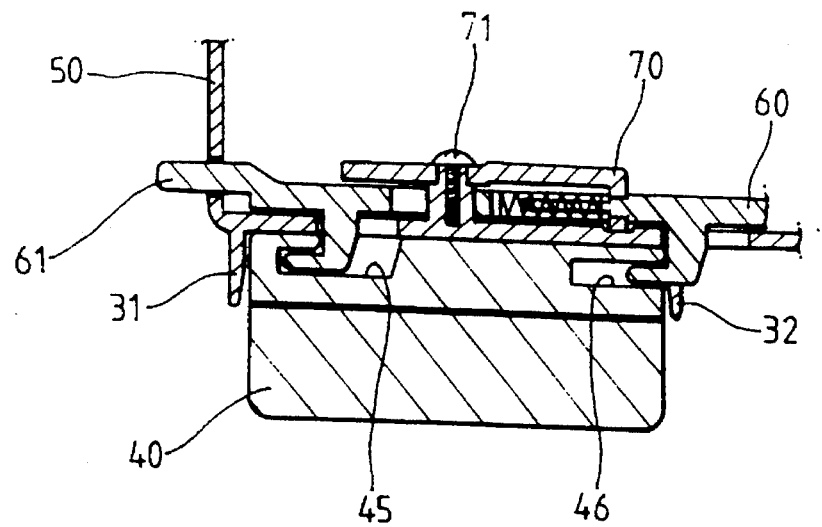
FIGS. 5 and 6 are cross-sectional views of the battery pack coupler of the present invention.
Figure 6:
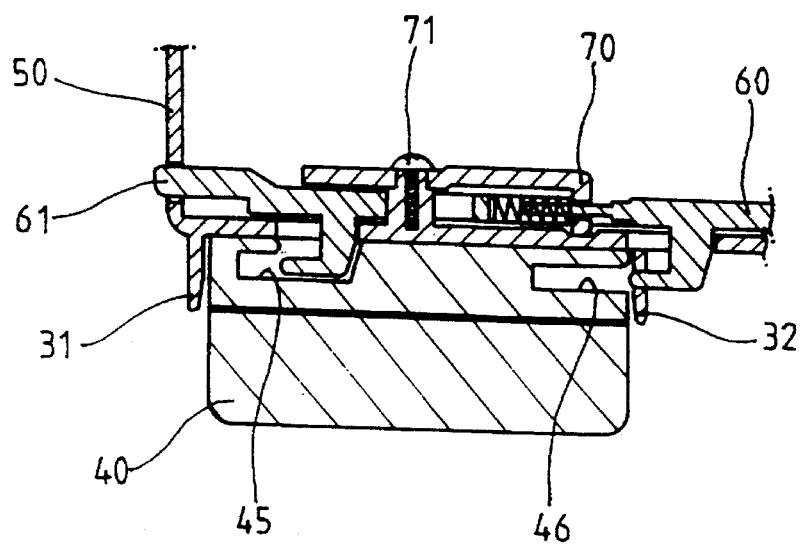

Referring to FIGS. 3 and 4, a battery-attaching plate or surface 35, having input terminals 33 and 34 for connection to output terminals 43 and 44 of a battery pack 40, is provided at the rear of a camcorder 30. Openings 45 and 46 are formed on the bottom and flank of battery pack 40 as shown in FIGS. 5 and 6.

Two guide holes 38 and 39 are formed in a line on battery-attaching plate 35. Guide ribs 31 and 32 are provided on the peripheries of battery-attaching plate 35, while being spaced apart from each other by the width of battery pack 40. An operating lever 60 with integrally formed hooking pieces 63 and 64 is slidably installed on the back of battery-attaching plate 35. The hooking pieces 63 and 64 pass through guide holes 38 and 39 and, when the battery pack is coupled to the camcorder, fit into openings 45 and 46 of the battery pack 40. Guide slots 62 and 65 are formed in operating lever 60 at a predetermined distance from one another. A boss 37 is provided on the inner surface of battery-attaching plate 35. Operating lever 60 is coupled to the plate 35 such that boss 37 passes through guide slot 62 and hooking pieces 63 and 64 pass through guide holes 38 and 39, respectively, so that operating lever 60 stably slides lengthwise without allowing substantially any sideways movement. A through hole 52 is formed on the flank of housing 50. A pressing portion 61 of one end of operating lever 60 is projected outside housing 50 via through hole 52. Operating lever 60 is elastically biased toward through hole 52 of housing 50 by an elastically biasing device.

The elastically biasing device consists of a protrusion 66 extending into the guide slot 65 from one end thereof, a spring 80 surrounding the protrusion 66, and a fixed plate 70.

The fixed plate 70 is bent to have a horizontal portion 73 and a vertical portion 74 with a slit 74' formed in the vertical portion 74. A female screw portion 37' is formed in boss 37, and a connection hole 72 is formed in horizontal portion 73 of fixed plate 70 so that fixed plate 70 is secured to boss 37 by a screw 71. The vertical portion 74 of plate 70 fits over protrusion 66, which passes through the slit 74', whereby spring 80 becomes supported between the vertical portion 74 and the end of guide slot 65 that does not connect with the protrusion. Since plate 70 is fixed relative to the plate 35, and spring 80 has one end pressing against the fixed plate 70 at one end of the guide slot 65, and further since the other end of spring 80 presses against the operating lever 60, the latter operating lever 60 is biased in the direction of the through opening 52 of housing 50. When the operating lever 60 slides toward the through hole 52, (to the left in FIGS. 4–6), the hooking piece 64 passes through a slot 32' formed in guide rib 32.

The battery pack coupler of the present invention constructed as described above operates in the following manner.

Referring to FIGS. 5 and 6, when the battery pack 40 is to be coupled to the camcorder 30, the operator presses the pressing portion 61 of operating lever 60 to move operating lever 60 and hooking pieces 63 and 64 to the right, compressing spring 80 and allowing the battery pack to be placed in the proper position on battery-attaching plate 35 between the guide rails 31 and 32. When the operator releases the pressing portion 61, the spring 80 forces the operating lever 60 towards the through hole 52 causing hooking pieces 63 and 64 of operating lever 60 to enter and fit into openings 45 and 46, respectively, of battery pack 40. Simultaneously, operating lever 60 pushes battery pack 40 become close to one-side guide rib 31 by the restoring force of spring 80. When in the combined condition, as shown in FIG. 5, hooking pieces 63 and 64 prevent the battery pack 40 from being pulled away from the plate 35 in a perpendicular direction, and guide rib 31 prevents the battery pack from being pulled away laterally.

When battery pack 40 is to be detached from camcorder 30, the operator depresses the pressing portion 61 to slidingly move operating lever 60 against the force of spring 80. The hooking pieces 63 and 64 move toward the right (as seen in the drawings) and become free from the ledges associated with the battery pack openings 45 and 46. As a result, the battery pack 40 can be removed in a direction perpendicular to battery-attaching plate 35.

Unlike the conventional coupler for battery packs, in the present invention the battery pack need not be attached by simultaneously pressing the battery pack and laterally pushing the pack, not is it necessary during the release operation to press a release button and simultaneously press the pack laterally. Rather, in the battery pack coupler of the present invention, the joining of battery pack is convenient because the battery pack is united with camcorder 30 by pushing pressing portion 61 of operating lever 60 and releasing the pressing force of operating lever 60 while battery pack 40 is put on battery-attaching plate 35. Further, the separation of battery pack 40 from camcorder 30 is carried out by merely detaching the battery pack perpendicular to battery-attaching plate 35 while pushing pressing portion 61 of operating lever 60. Accordingly, the battery pack coupler for a camcorder of the present invention is convenient in joining and detaching a battery pack.

What is claimed is:

1. A battery pack coupler for detachably uniting a battery pack to battery-attaching plate of a camcorder housing, said battery pack having openings formed on the bottom and one flank thereof, said coupler comprising:

a plurality of guide holes formed in said battery-attaching plate;

guide ribs formed on said battery-attaching plate at positions spaced apart an amount substantially equal the width of said battery pack, one of said guide ribs having an aperture formed therein;

an operating lever having hooking pieces thereon, said operating lever being positioned relative to said plate so that said hooking pieces pass through said plurality of guide holes, respectively to project outside said housing, said operating lever being slidable to a hooked position; and elastically biasing means for elastically biasing said operating lever in one direction to said hooked position wherein said hooking pieces are engaged with said openings, wherein one of said hooking pieces passes through said aperture when said operating lever is moved to said hooked position.

2. A battery pack coupler as claimed in claim 1, wherein said operating lever has at least one guide slot and a protrusion provided on one end of said guide slot, and said elastically biasing means comprises a fixed plate having a slit into which said protrusion is sliding fitted and fastened to said housing an a spring coupled to said protrusion, so that said spring is supported between said fixed plate and one end of said guide slot such that said operating lever receives an elastic force toward the outside of said housing.

3. A battery pack coupler for coupling a battery pack to a camcorder, said battery pack having a plurality of openings with engaging means therein for coupling the battery pack to said camcorder; said battery pack coupler comprising:

a battery attaching plate positioned on said camcorder and having a plurality of slots thereon corresponding in position generally to the said openings in said battery pack;

a fixed plate attached to said battery attaching plate;
slide plate means slideably positioned relative to said battery attaching plate and said fixed plate and having hooking elements configured to hook onto the engaging means of said battery pack through said openings in said battery pack;

a biasing element fixed between said slide plate and said fixed plate biasing said slide plate in a first direction; and a pressing element extending outside said camcorder and operable, when pressed to push said slide plate against the bias of said biasing element to slide said plate in a second direction opposite said first direction;

whereby when said slide plate means is pushed in said second direction, the hooking elements are positioned so that said battery pack can be placed in an attaching position on said battery attaching plate perpendicularly without interference from said hooking elements, and whereby when said slide plate means is moved in said first direction by the force of said biasing means and said battery pack is positioned on said battery attaching plate said hooking elements engage said battery pack through said openings.

4. A battery pack coupler as claimed in claim 3, wherein said slide plate and said pressing element and said slide plate means are integrally formed and the said pressing element is an extension of said slide plate extending outside of said housing.

5. A battery pack coupler as claimed in claim 3, wherein said biasing element is a spring coupled between said fixed plate and said slide plate means.

6. A battery pack coupler as claimed in claim 5, wherein said slide plate means has at least one slot therein and a protrusion extending from one edge of said one slot into said slot; said spring surrounding said protrusion and having one end pressing against a second edge of said slot opposite said one edge, and wherein said fixed plate has a portion thereof slideably riding on said protrusion at a position opposite said second edge of said one slot, and wherein said spring has a second end pressing against the said portion of said fixed plate that rides on said protrusion.

7. A battery pack as claimed in claim 6, wherein said fixed plate is screwed to a boss attached to the inner side of said battery attaching plate.

8. A battery pack as claimed in any one of claims 3–7, further comprising a pair of ribs positioned parallel to one another on the external side of said battery attaching plate and at a distance from one another substantially equal to the width of said battery pack.

9. A battery pack coupler as claimed in claim 8, wherein said slide plate and said pressing element and said slide plate are integrally formed and the said pressing element is an extension of said slide plate extending outside of said housing.

10. A battery pack coupler as claimed in claim 9, wherein one of said ribs has an opening therein through which one of said hooking elements passes at when said battery pack is coupled to said battery attaching plate.

11. A battery pack coupler as claimed in claim 10, wherein said battery attaching plate has two slots therein, said slide plate has two hooking elements, which pass through said two slots in said battery attaching plate, respectively, and said battery pack has two openings with engaging means therein for engaging, respectively, said two hooking elements.

12. A battery pack coupler for coupling a battery pack to a camcorder, comprising:

a battery pack having a plurality of openings with engaging means therein for coupling the battery pack to said camcorder;

a battery attaching plate positioned on said camcorder and having a plurality of slots thereon corresponding in position generally to the said openings in said battery pack;

a fixed plate attached to said battery attaching plate;

slide plate means slideably positioned relative to said battery attaching plate and said fixed plate and having hooking elements configured to hook onto the engaging means of said battery pack through said openings in said battery pack;

a biasing element fixed between said slide plate and said fixed plate biasing said slide plate in a first direction; and a pressing element extending outside said camcorder and operable, when pressed to push said slide plate means against the bias of said biasing element to slide said plate in a second direction opposite said first direction;

whereby when said slide plate means is pushed in said second direction, the hooking elements are positioned so that said battery pack can be placed in an attaching position on said battery attaching plate perpendicularly without interference from said hooking elements, and whereby when said slide plate means is moved to said first direction by the force of said biasing means and said battery pack is positioned on said battery attaching plate said hooking elements engage said battery pack through said openings.

\* \* \* \* \*